(12) United States Patent  
Guan

(10) Patent No.: US 7,860,090 B2  
(45) Date of Patent: Dec. 28, 2010

(54) METHOD FOR PROCESSING LMP PACKETS, LMP PACKET PROCESSING UNIT AND LMP PACKET PROCESSING NODE

(75) Inventor: Hongguang Guan, Shenzhen (CN)

(73) Assignee: Huawei Technolgies Co., Ltd., Shenzhen (CN)

( * ) Notice: Subject to any disclaimer, the term of this patent is extended or adjusted under 35 U.S.C. 154(b) by 33 days.

(21) Appl. No.: 12/262,521

(22) Filed: Oct. 31, 2008

(65) Prior Publication Data

US 2009/0059920 A1     Mar. 5, 2009

Related U.S. Application Data

(63) Continuation of application No. PCT/CN2006/003197, filed on Nov. 28, 2006.

(30) Foreign Application Priority Data

May 1, 2006     (CN) ................... 2006 1 0060662

(51) Int. Cl.  
*H04L 12/28* (2006.01)
(52) U.S. Cl. ........................ 370/389; 398/31
(58) Field of Classification Search ................. 370/389, 370/218; 398/31  
See application file for complete search history.

(56) References Cited

U.S. PATENT DOCUMENTS

2001/0033548 A1* 10/2001 Saleh et al. ................. 370/218
2004/0114922 A1   6/2004 Hardee
2004/0218550 A1  11/2004 Kim
2006/0120719 A1*  6/2006 Bradford et al. ............... 398/31
2006/0133266 A1*  6/2006 Kim et al. .................... 370/228
2006/0256712 A1* 11/2006 Imajuku et al. ............. 370/218

FOREIGN PATENT DOCUMENTS

| CN | 1622547 A | 6/2005 |
| CN | 1801802 A | 7/2006 |
| EP | 1 432 178 A2 | 6/2004 |
| EP | 1 511 234 A1 | 3/2005 |
| JP | 2004-336716 A | 11/2004 |

OTHER PUBLICATIONS

Lang et al., Link Management Protocol (LMP), *IETF Standard* (RFC4204), 1-86 (Oct. 2005).
Lang et al., "WG Last Call," *IETF Draft*, 1-2 (Nov. 14, 2002) http://ops.ietf.org/lists/ccamp/ccamp.2002/msg01248.html.

* cited by examiner

*Primary Examiner*—Dang T Ton  
*Assistant Examiner*—Wei Zhao  
(74) *Attorney, Agent, or Firm*—Leydig, Voit & Mayer, Ltd.

(57) ABSTRACT

The present invention discloses a method for processing LMP packet carrying a control message, which includes: receiving the LMP packet carrying a control message from a peer LMP node, determining whether a state of a control channel is an available state according to the LMP packet, and updating or resetting a HelloDeadInterval timer if the control channel is in the available state. When the control channel is in the available state, the processed LMP packet is sent to the peer node, a new LMP packet carrying the control message is generated and sent to the peer node, and a HelloInterval timer is updated or reset. The present invention further provides a LMP processing unit and a LMP packet processing node.

7 Claims, 6 Drawing Sheets

METHOD FOR PROCESSING LMP PACKETS, LMP PACKET PROCESSING UNIT AND LMP PACKET PROCESSING NODE

CROSS-REFERENCE TO RELATED APPLICATIONS

This application is a continuation of International Patent Application No. PCT/CN2006/003197, filed Nov. 28, 2006, which claims priority to Chinese Patent Application No. 200610060662.3, filed May 1, 2006, both of which are hereby incorporated by reference in their entirety.

FIELD OF THE INVENTION

The present invention relates to the network link channel management in the technical field of network communications, and in particular, to a method for processing LMP packets, a LMP packet processing unit, and a LMP packet processing node.

BACKGROUND OF THE INVENTION

In the Generalized Multi-Protocol Label Switching (GMPLS) protocol family, Link Management Protocol (LMP) is used for implementing an association between the control channel management and the data channel ownership. LMP maintains and checks the reliability of the control channel connection through using a mechanism of transceiving a Hello message at a scheduled time by defining two timers.

In LMP specifications, a HelloDeadInterval timer is updated or reset only when a LMP processing unit receives a Hello message from a peer end, and a HelloInterval timer is updated or reset only when the LMP processing unit sends a Hello message. The HelloInterval and the HelloDeadInterval are both measured in milliseconds. In a default case, the HelloInterval is set to be 150 ms, and the HelloDeadInterval is defined to be 500 ms.

FIG. 1 is a diagram showing the principle of the method for processing a LMP packet.

A LMP node includes two timers: one is HelloInterval timer that defines the transmission interval of a Hello message; the other is HelloDeadInterval timer that determines that a peer LMP node fails. As specified in LMP, after each control channel is established, the LMP node sends a Hello message to a peer LMP node periodically at a time interval defined by the HelloInterval; meanwhile, the LMP node also receives a Hello message sent from the peer LMP node periodically at the time interval defined by the HelloInterval.

If the LMP node does not receive Hello message from the peer LMP node in the time period defined by the HelloDeadInterval, it is regarded that the peer LMP node fails, and thereby it is regarded that the control channel between the LMP endpoint and the peer LMP node fails.

If the HelloInterval timer times out, the LMP processing unit is notified to transmit the Hello message. The LMP processing unit sends the Hello message to the peer node via a LMP packet transmitting controller.

The HelloDeadInterval timer and the HelloInterval timer may employ a default scheduled time interval value, or may be set via a configuration and management platform. In the prior art, the LMP node updates the HelloDeadInterval timer only after a Hello packet from the peer end is received, but the HelloInterval timer will not be updated or reset by an outside event.

FIG. 2 shows a flow chart of the method for processing a LMP packet, which includes the following steps:

Step 1: A LMP processing unit receives a LMP packet from a peer LMP node that is input by a LMP packet receiving controller.

Step 2: The LMP processing unit detects the state of a control channel corresponding to the LMP packet received. If the control channel is in an available state, Step 3 is executed; if the control channel is in an unavailable state, Step 5 is executed.

Step 3: It is determined whether the LMP packet is a Hello message. If the LMP packet is a Hello message, Step 4 is executed; otherwise, Step 5 is executed.

Step 4: The LMP processing unit updates or resets a HelloDeadInterval timer.

Step 5: The LMP processing unit processes the packet.

LMP is a control protocol on a light load control channel. However, in the existing method for processing LMP packet, the HelloInterval timer is updated or reset only when a Hello message is sent. Therefore, even when the control channel of a LMP node transceives other control information normally, the Hello message is still sent to the peer node via a LMP packet transmitting controller periodically at a time interval set, according to the HelloInterval. At this point, although the control channel is available evidently, a large amount of unnecessary Hello messages are still congested in the control channel; thus, the utilization of the control channel is lowered. Meanwhile, a large amount of Hello messages may cause the loss and retransmission of a normal control message, and this may further increase the load of the control channel and make it unable to establish a Label Switched Path (LSP) of GMPLS. Moreover, when the load of the control channel is increased due to the interleaving of LMP Hello messages and common control messages, the Hello message may be discarded; thus, the Hello message may not be definitely responded or retransmitted, and finally, it may be caused that the peer end of the control channel considers that the control channel is failed, thereby performs a maloperation.

SUMMARY OF THE INVENTION

The present invention provides a method for processing LMP packet, a LMP processing unit, and a LMP packet processing node, thereby the problems in the existing method for processing the LMP packet that the channel utilization is lowered and the control channel is caused to fail because a large amount of unnecessary Hello messages are congested in the control channel may be solved.

The present invention provides a method for processing LMP packet, which is adapted to process a LMP packet carrying a control message, including:

receiving the LMP packet carrying the control message from a peer LMP node; and determining whether a state of a control channel is an available state, according to the LMP packet; updating or resetting a HelloDeadInterval timer if the control channel is in the available state.

The present invention provides another method for processing LMP packet, including:

generating a LMP packet carrying a control message and sending the LMP packet to a peer node; and updating or resetting a HelloInterval timer.

The present invention provides a LMP processing unit, which includes a LMP packet processing unit and a first resetting unit, where the LMP packet processing unit is adapted to receive a LMP packet carrying a control message from a peer LMP node, and determine whether a state of a control channel is an available state, according to the LMP packet; and instruct the first resetting unit to update or reset a HelloDeadInterval timer, if the control channel is in the available state.

The present invention provides another LMP processing unit, including:

a first processing unit, adapted to generate a LMP packet carrying a control message, send the LMP packet to a peer node, and perform instruction; and a second resetting unit, adapted to update or reset a HelloInterval timer.

The present invention provides a LMP packet processing node, which is adapted to process an LMP packet carrying a control message, wherein the node includes a HelloDeadInterval timer, a HelloInterval timer, a LMP packet receiving controller, a LMP packet transmitting controller and a LMP processing unit; wherein, the LMP processing unit includes a LMP packet processing unit and a first resetting unit, and wherein the LMP packet processing unit is adapted to: receive a LMP packet carrying a control message from a peer LMP node via the LMP packet receiving controller; and determine whether a state of a control channel is an available state, according to the LMP packet; and instruct the first resetting unit to update or reset the HelloDeadInterval timer, if the control channel is in the available state.

The present invention provides another LMP packet processing node, which is adapted to process a LMP packet carrying a control message, wherein the node includes a HelloDeadInterval timer, a HelloInterval timer, a LMP packet receiving controller, a LMP packet transmitting controller, and a LMP processing unit; wherein the LMP processing unit includes:

a first processing unit, adapted to generate a LMP packet carrying a control message, send the LMP packet to a peer node via the LMP packet transmitting controller, and perform instruction; and a second resetting unit, adapted to update or reset the HelloInterval timer.

In comparison with the prior art, the present invention has the following beneficial effects: when the LMP control channel is available and can normally transceive a control message, the transceiving of a large amount of redundant Hello messages may be avoided by updating or resetting the HelloDeadInterval timer and the HelloInterval timer, and the utilization of the control channel may also be improved. Meanwhile, it may also be avoided that the control channel becomes busy and an unreliably transmitted Hello message is lost due to the transceiving of a large amount of redundant Hello messages, thereby wrongly determining that the control channel or critical LMP functions is or are failed.

DETAILED DESCRIPTION OF THE EMBODIMENTS

The present invention will now be illustrated in detail in conjunction with the drawings.

Figure 1:
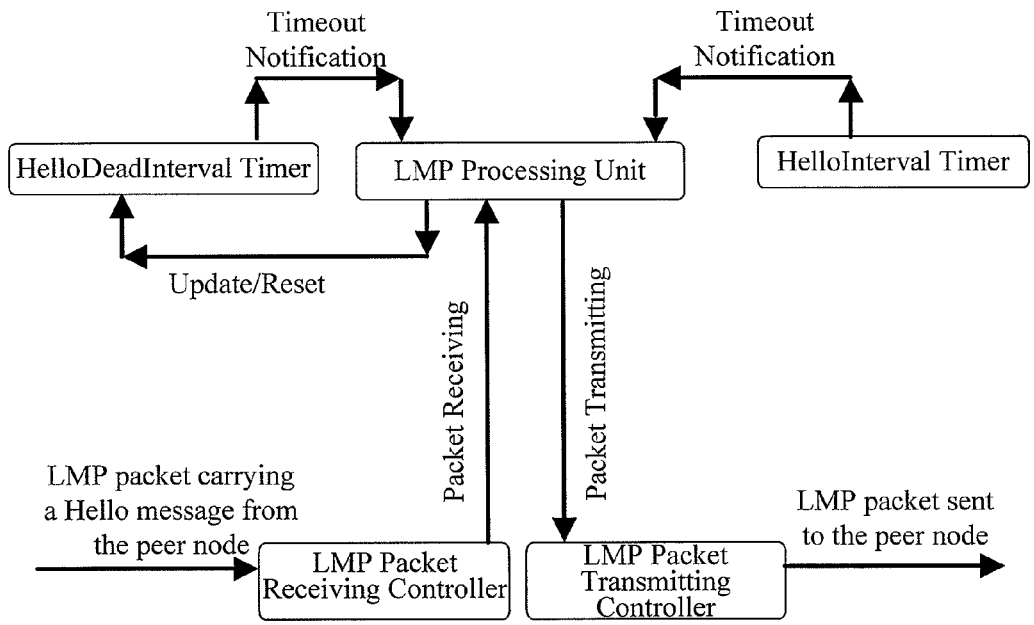
FIG. 1 is a schematic diagram of the method for processing a LMP packet.
Figure 2:
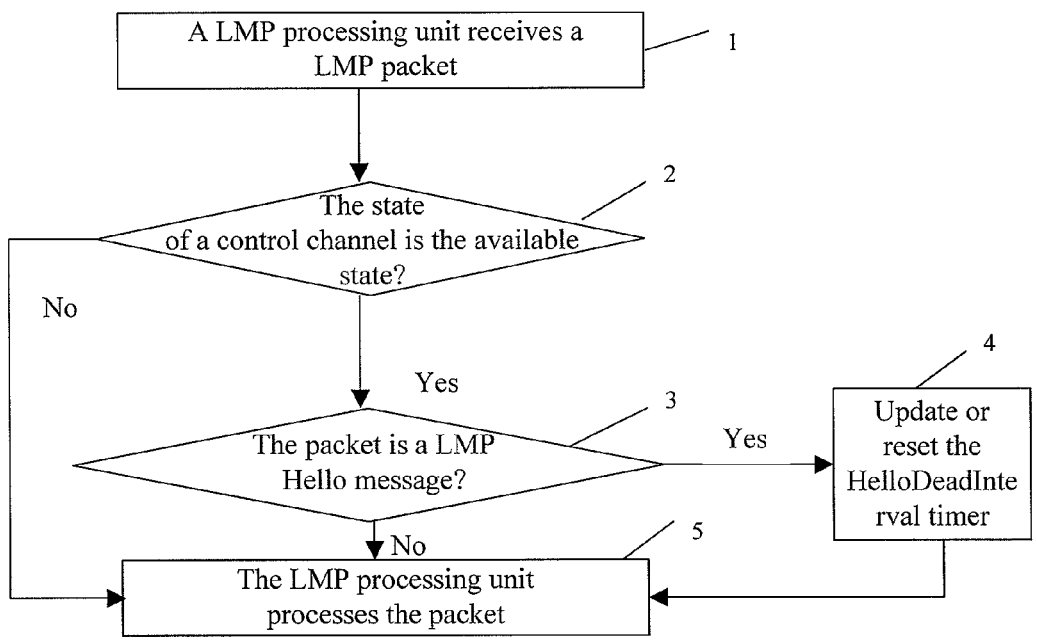
FIG. 2 is a flow chart of the method for processing a LMP packet.
Figure 3:
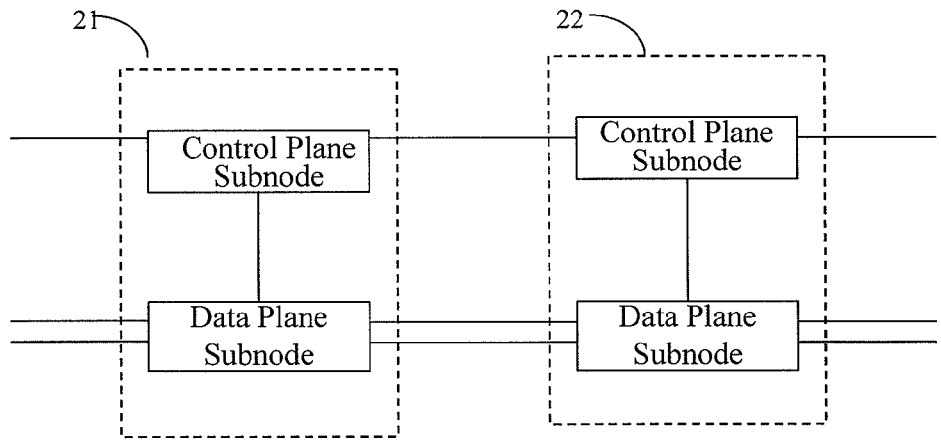
FIG. 3 is a schematic diagram showing the structure of a network, according to an embodiment of the present invention.

First, reference can be made to FIG. 3, which is a schematic diagram showing the structure of a network according to the present invention. The network environment shown in FIG. 3 is a typical network environment, such as in an Automatically Switched Optical Network (ASON). The network environment shown in FIG. 3 includes two LMP nodes 21 and 22. Each LMP node includes a control plane subnode and a data plane subnode. In other words, in each LMP node, the control plane and the data plane are separated. The control plane subnode manages the resources of the data plane subnode via a control link. Between the control plane subnodes, the application of a data plane link between the data plane subnodes is negotiated via LMP, where LMP is carried on a control plane link for delivery. A LMP node detects a peer LMP node automatically or via configuration, and then negotiates to establish a LMP control channel via a LMP control channel configuration message. After the LMP control channel turns to an available state, the local LMP node is informed of the link information of the controlled data plane subnode via other messages provided by LMP, and the local LMP node negotiates the application of the data plane link with the peer LMP node. The Hello message in LMP is used for monitoring and maintaining the availability state of the LMP control channel.

Figure 4:
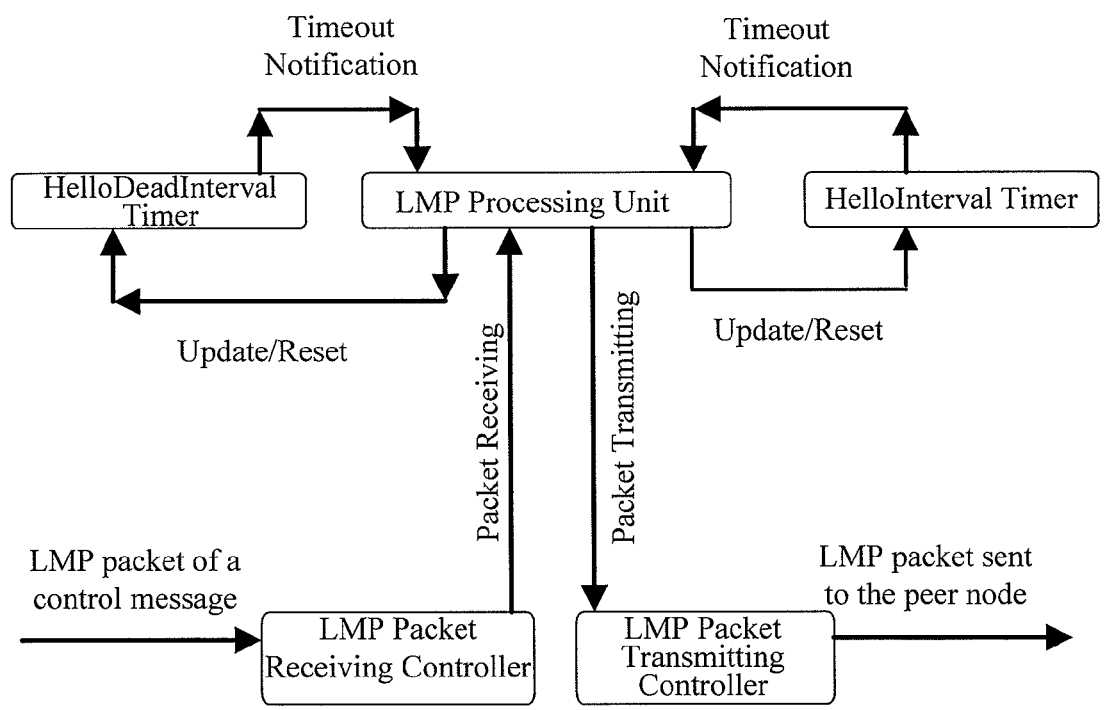
FIG. 4 is a block diagram of a LMP packet processing node, according to an embodiment of the present invention.

A specific embodiment of the control plane subnode in FIG. 3 is shown in FIG. 4. FIG. 4 is a block diagram of the LMP packet processing node, according to an embodiment of the present invention. The LMP packet processing node shown in FIG. 4 is adapted to process a LMP packet carrying a control message, and includes a HelloDeadInterval timer, a HelloInterval timer, a LMP packet receiving controller, an LMP packet transmitting controller, and a LMP processing unit, where a LMP packet carrying a Hello message or other control messages, which comes from a peer node, is input to the LMP processing unit via a LMP packet receiving controller. The LMP processing unit detects the LMP packet received, determines the state of the control channel corresponding to the LMP packet of other control messages. If the control channel is in the available state, the LMP processing unit updates or resets the HelloDeadInterval timer. The LMP processing unit updates or resets the HelloInterval timer when sending the LMP packet to the peer node via the LMP packet transmitting controller.

If a LMP packet from the peer node is not received in the set time period, the HelloDeadInterval timer notifies the LMP processing unit that the control channel fails.

If the HelloInterval timer times out, the LMP processing unit is notified to send a Hello message. The LMP processing unit sends the Hello message to the peer node via a LMP packet transmitting controller, and updates or resets the HelloInterval timer at the same time.

Figure 5:
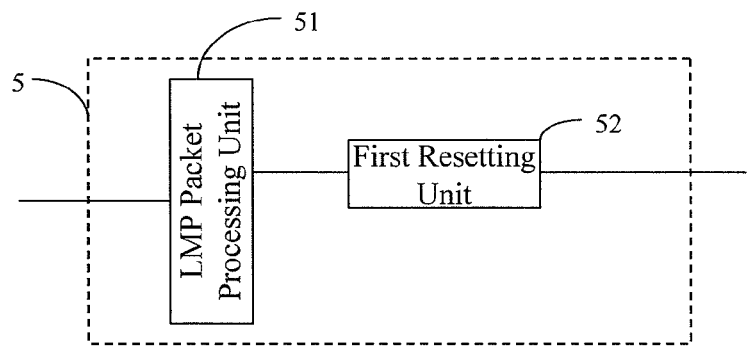
FIG. 5 is a block diagram of the LMP processing unit, according to a first embodiment of the present invention.

An embodiment of the structure of the LMP processing unit in FIG. 4 is shown in FIG. 5. FIG. 5 is a block diagram of the LMP processing unit, according to an embodiment of the present invention. The LMP processing unit 5 shown in FIG. 5 includes a LMP packet processing unit 51 and a first resetting unit 52, where the LMP packet processing unit 51 is adapted to receive the LMP packet carrying a control message from a peer LMP node via the LMP packet receiving controller, and determine whether the state of the control channel is the available state, according to the LMP packet. If the control channel is in the available state, the LMP packet processing unit 51 instructs the first resetting unit 52 to update or reset the HelloDeadInterval timer.

Figure 6:
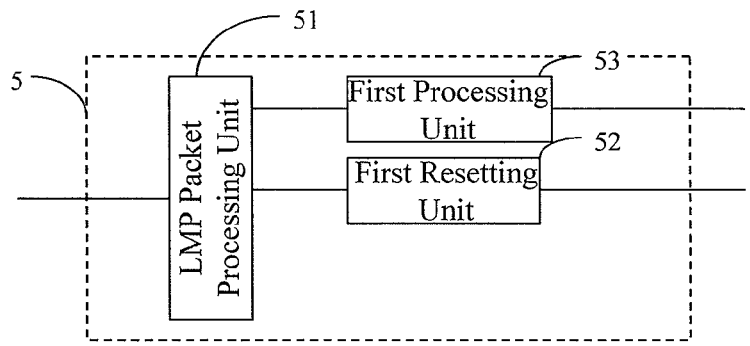
FIG. 6 is a block diagram of the LMP processing unit, according to a second embodiment of the present invention.

An embodiment of the structure of the LMP processing unit in FIG. 4 is further shown in FIG. 6. FIG. 6 is a block diagram of the LMP processing unit, according to the second embodiment of the present invention. As different from the embodiment shown in FIG. 5, the LMP processing unit 5 shown in FIG. 6 further includes a first processing unit 53. When the control channel is in the available state, the first processing unit 53 is adapted to receive an instruction from the LMP packet processing unit 51, process the LMP packet and send the LMP packet processed to the peer node via the LMP packet transmitting controller, or generate a new LMP packet carrying a control message and send the new LMP packet to the peer node via the LMP packet transmitting controller. Here, in a practical example for processing the packet, when a Hello message is carried in the packet, the Hello message is copied to the new packet.

Figure 7:
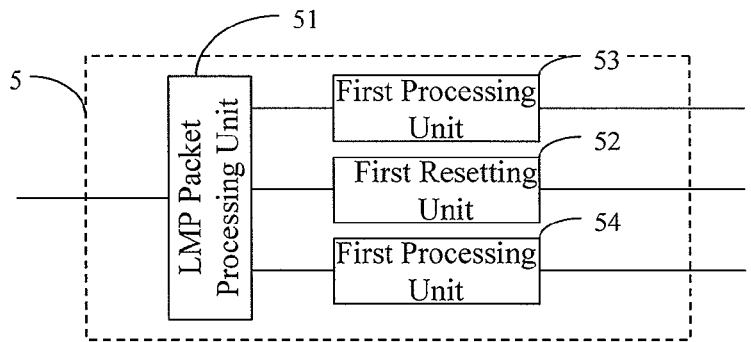
FIG. 7 is a block diagram of the LMP processing unit, according to a third embodiment of the present invention.

An embodiment of the structure of the LMP processing unit in FIG. 4 is further shown in FIG. 7. FIG. 7 is a block diagram of the LMP processing unit, according to the third embodiment of the present invention. As different from the embodiment in FIG. 6, the LMP processing unit 5 shown in FIG. 7 further includes a second resetting unit 54, which is adapted to receive an instruction from the LMP packet processing unit 51 and update or reset the HelloInterval timer when the control channel is in the available state.

Figure 8:
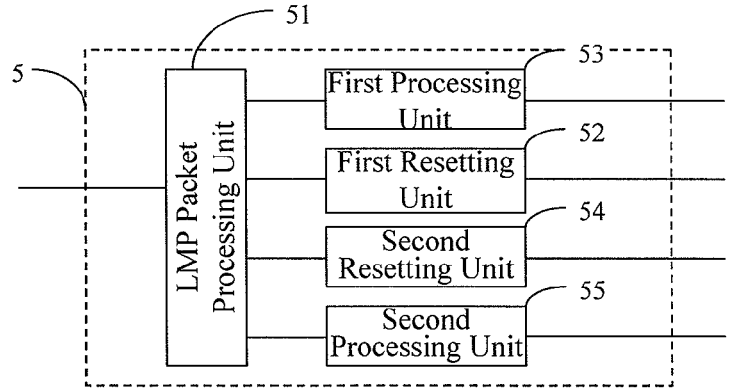
FIG. 8 is a block diagram of the LMP processing unit, according to a fourth embodiment of the present invention.

An embodiment of the structure of the LMP processing unit in FIG. 4 is further shown in FIG. 8. FIG. 8 is a block diagram of the LMP processing unit, according to the fourth embodiment of the present invention. As different from the embodiment in FIG. 7, the LMP processing unit 5 shown in FIG. 8 further includes a second processing unit 55, which is adapted to receive an instruction from the LMP packet processing unit 51 and continue to determine the type of the LMP packet when the control channel is in the unavailable state. If the LMP packet is a LMP packet carrying configuration information, the packet is processed according to the LMP specification; otherwise, the LMP packet is discarded.

Figure 9:
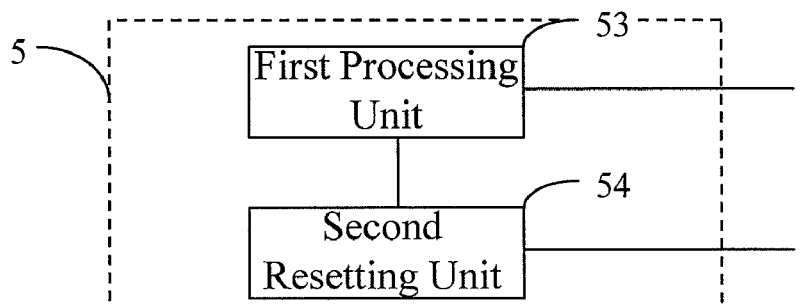
FIG. 9 is a block diagram of the LMP processing unit, according to a fifth embodiment of the present invention.

An embodiment of the structure of the LMP processing unit in FIG. 4 is further shown in FIG. 9. FIG. 9 is a block diagram of the LMP processing unit, according to the fifth embodiment of the present invention. The LMP processing unit 5 shown in FIG. 9 includes a first processing unit 53 and a second resetting unit 54, where the first processing unit 53 is adapted to generate a LMP packet carrying a control message, send the LMP packet to the peer node via the LMP packet transmitting controller, and instruct the second resetting unit 54 to update or reset the HelloInterval timer.

Figure 10:
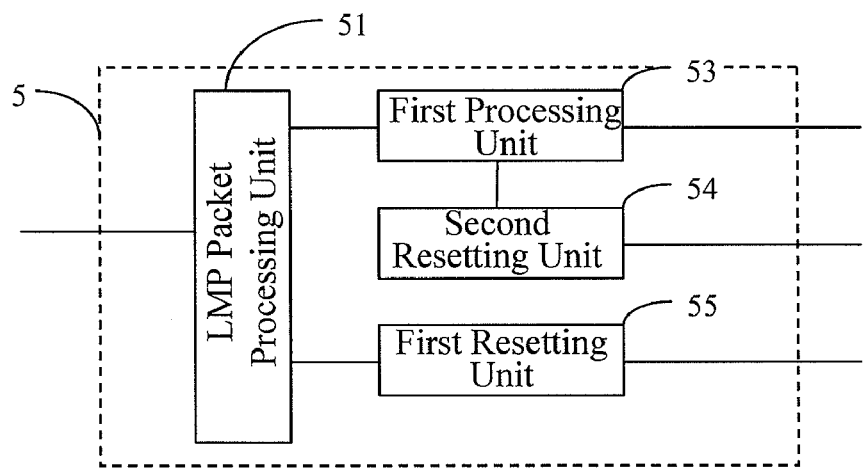
FIG. 10 is a block diagram of the LMP processing unit, according to a sixth embodiment of the present invention.

An embodiment of the structure of the LMP processing unit in FIG. 4 is further shown in FIG. 10. FIG. 10 is a block diagram of the LMP processing unit, according to the sixth embodiment of the present invention. As different from the embodiment in FIG. 9, the LMP processing unit 5 shown in FIG. 10 further includes a LMP processing unit 51 and a first resetting unit 52, where the LMP processing unit 51 is adapted to receive a LMP packet carrying a control message from the peer LMP node via the LMP packet receiving controller, and determine whether the state of the control channel is the available state, according to the LMP packet. If the control channel is in the available state, the LMP processing unit 51 instructs the first resetting unit to update or reset the HelloDeadInterval timer. In this embodiment, when the control channel is in the available state, the first processing unit receives an instruction from the LMP processing unit 51 and processes the LMP packet, and sends the LMP packet processed to the peer node via the LMP packet transmitting controller.

Figure 11:
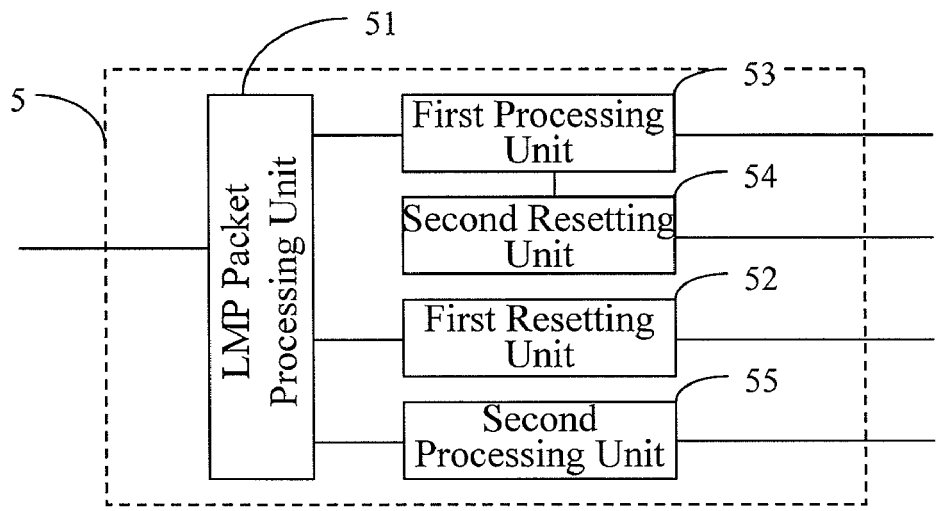
FIG. 11 is a block diagram of the LMP processing unit, according to a seventh embodiment of the present invention.

An embodiment of the structure of the LMP processing unit in FIG. 4 is further shown in FIG. 11. FIG. 11 is a block diagram of the LMP processing unit, according to the seventh embodiment of the present invention. As different from the embodiment in FIG. 10, the LMP processing unit 5 shown in FIG. 11 further includes a second processing unit 55, which is adapted to continue to determine the type of the LMP packet when the control channel is in the unavailable state. If the LMP packet is a configuration packet, the packet is processed according to the LMP specification; otherwise, the LMP packet is discarded.

Figure 12:
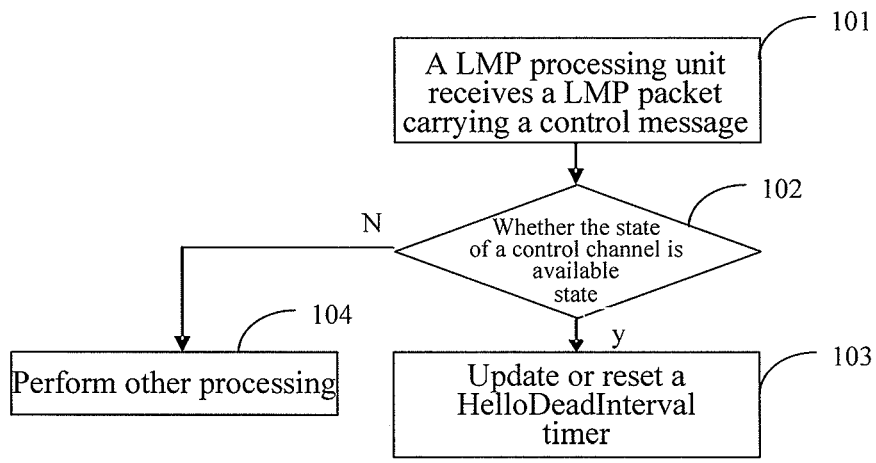
FIG. 12 is a flow chart of the LMP processing method, according to a first embodiment of the present invention.
Figure 13:
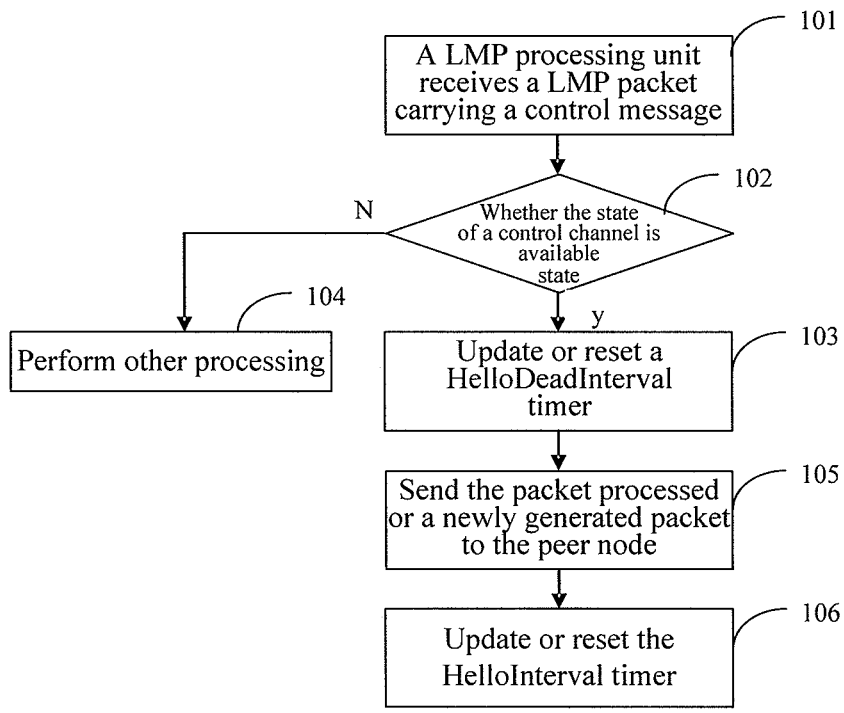
FIG. 13 is a flow chart of the LMP processing method, according to a second embodiment of the present invention.

FIG. 12 is a flow chart of the LMP processing method, according to the first embodiment of the present invention. As shown in FIG. 12, first of all, in Step 101, a LMP processing unit receives a LMP packet carrying a control message from a peer LMP node via a LMP packet receiving controller; then in Step 102, the LMP processing unit determines whether the state of a control channel is an available state, according to the LMP packet. If the control channel is in the available state, a HelloDeadInterval timer is updated or reset in Step 103.

Because the format of the LMP message is defined in LMP standard specifications (for example, in standard RFC4204), each LMP message has a fixed field to describe the type of the LMP message. Here, the message is a control message. Meanwhile, the LMP further specifies a correlation between the type of the LMP message and the state of the LMP control channel via a finite state machine of the LMP control channel. Therefore, as specified in the LMP specifications, the initial state of the LMP control channel of a node is in the "Down" state. After a Config (configuration) message is sent in the "Down" state, the LMP control channel turns to the "ConfSnd" state; after a Config message is received and a negative response, i.e. a ConfigNack message, is sent in the "ConfSnd" state, the LMP control channel turns to the "ConfRcv" state; in the "ConfSnd" state, each time a Config message is received and a positive response, i.e. a ConfigAck message is sent, the LMP control channel turns to the "Active" state; in the "Active" state, if an expected Hello message is received, the LMP control channel turns to the "Up" state. The "Active" state and the "Up" state represent that the LMP control channel is in the "available state," while other states represent that the LMP control channel is in the "unavailable state." The "Unavailable state" includes the initial state "Down" and the control channel parameter negotiation state "ConfSnd" and "ConfRcv." Only the LMP control channel configuration messages Config, ConfigAck and ConfigNack may influence the availability of the state of the LMP control channel. The Hello message specified in LMP is used for monitoring and maintaining the availability state of the LMP control channel. As specified in LMP, other messages of LMP, such as Begin-Verify and BeginVerifyAck, are only sent when the LMP control channel is in the available state. This means that the control channel is in the available state if other messages from the LMP peer end, for example, a non-LMP control channel configuration message or messages that are not sent via an independent data channel, such as Test message, are received. The above messages are sent or received via LMP packets. Therefore, in Step 102, the LMP processing unit may determine whether the state of the control channel is the available state, according to the LMP packet. In addition, the control message in the embodiment shown in FIG. 12 is a control message defined in LMP that is transmitted via the control channel and does not influence the state of a finite state machine of the local control channel, such as Hello message, BeginVerify message, BeginVerifyAck message, and Begin-VerifyNack message.

FIG. 12 is a flow chart of the LMP processing method, according to the second embodiment of the present invention. In comparison with the embodiment shown in FIG. 11, Steps 105 and 106 are added. In Step 105, when the control channel is in the available state, the LMP processing unit processes the LMP packet and send the LMP packet processed to the peer node, or generates a new LMP packet carrying the control message and sends the new LMP packet to the peer node; then, in Step 106, the LMP processing unit updates or resets the HelloInterval timer.

In the embodiments shown in FIG. 11 and FIG. 12, if the control channel is in the unavailable state, Step 104 is executed, where the LMP packet received is processed. In Step 104, it is required to determine the LMP message received when the LMP control channel is in the unavailable state. If the message is a LMP control channel configuration message, the message is processed, according to the specification of the finite state machine of the LMP control channel in the LMP standard; if the message is not a LMP control channel configuration message, the LMP packet carrying the message is discarded and the system resources occupied by the LMP packet, such as the memory space, are released.

In addition, the third embodiment of the method based on the embodiments shown in FIG. 11 and FIG. 12 further includes the following step: If the LMP processing unit does not receive the LMP packet from the peer node within a preset time, the HelloDeadInterval timer cannot be updated or reset in Step 103; therefore, the HelloDeadInterval timer times out, and the LMP processing unit is notified that the control channel fails.

The fourth embodiment of the method based on the third embodiment further includes the following step: If the HelloInterval timer exceeds a preset scheduled time, the LMP processing unit is notified to send a Hello message to the peer node.

Figure 14:
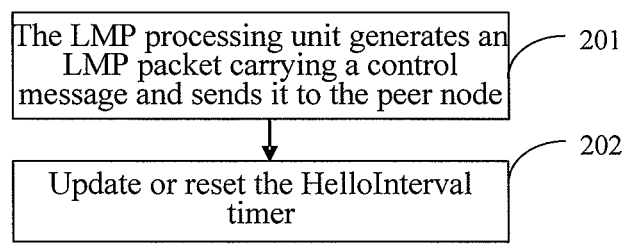
FIG. 14 is a flow chart of the LMP processing method, according to a fifth embodiment of the present invention.

FIG. 14 is a flow chart of the LMP processing method, according to the fifth embodiment of the present invention. The embodiment shown in FIG. 14 includes two steps: First, in Step 201, the LMP processing unit generates a LMP packet carrying the control message, and sends the LMP packet to the peer node; then, in Step 202, the HelloInterval timer is updated or reset.

Figure 15:
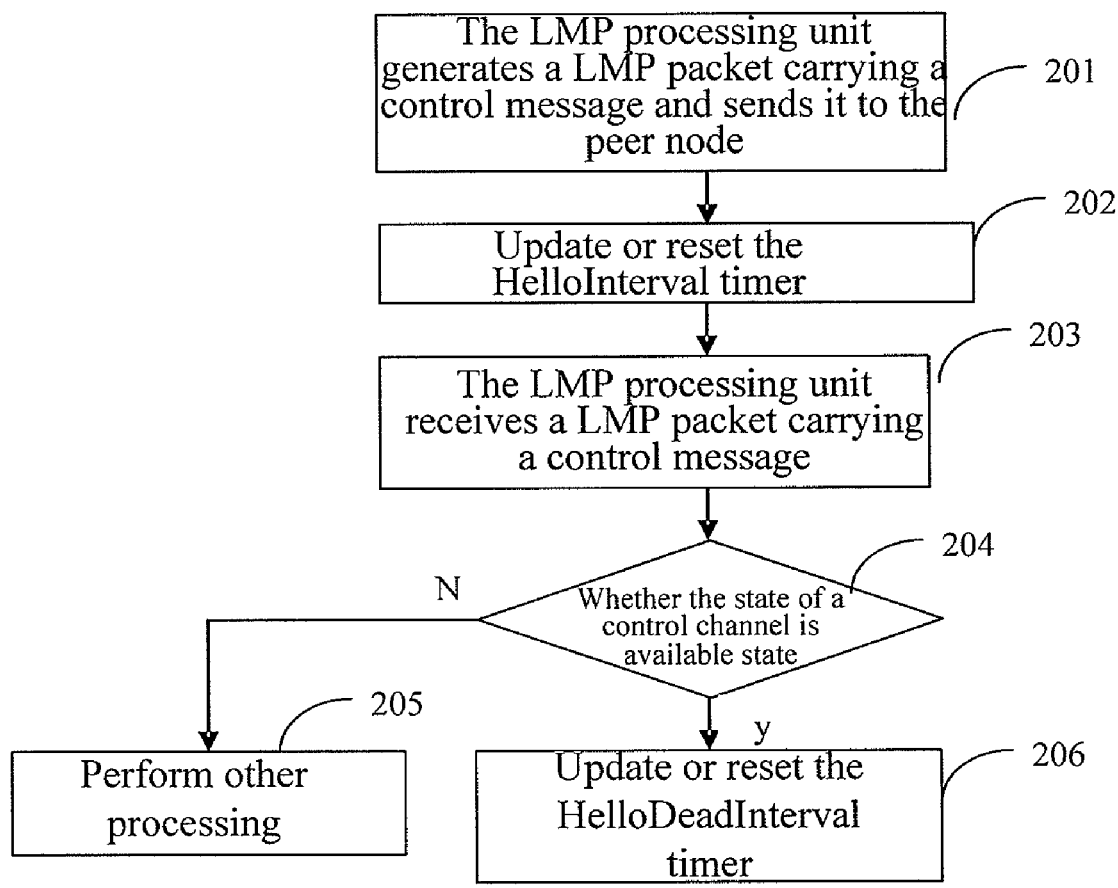
FIG. 15 is a flow chart of the LMP processing method, according to a sixth embodiment of the present invention.

FIG. 15 is a flow chart of the LMP processing method, according to the sixth embodiment of the present invention. FIG. 15 is based on the embodiment shown in FIG. 14, where in a newly added Step 203, the LMP processing unit receives a LMP packet carrying a control message from a peer LMP node; then, in Step 204, the LMP processing unit determines whether the state of the control channel is the available state, according to the LMP packet, if the control channel is in the available state, the HelloDeadInterval timer is updated or reset in Step 206.

Other embodiments of the method based on the embodiments shown in FIG. 14 and FIG. 15 further includes the following step: When the control channel is in the available state, the LMP processing unit sends the LMP packet processed to the peer node.

Additionally, in the embodiments shown in FIG. 14 and FIG. 15, in a typical embodiment of Step 205, when the control channel is in the unavailable state, if the LMP packet is a configuration packet, the LMP processing unit processes the packet, according to the LMP specification; otherwise, the LMP packet is discarded.

Wherein, the control message is a control message that is transmitted via the control channel and does not influence the state of the finite state machine of the local control channel.

The above embodiments of the present invention are only illustrative. It is apparent that variations and modifications of the present invention will readily occur to those skilled in the art without departing from the scope of the present invention. Therefore, if the modifications and variations of the invention pertain to the scope of the claims of the invention and the equivalent technologies thereof, such modifications and variations are intended to be included in the present invention.

What is claimed is:

1. A method for processing a Link Management Protocol (LMP) packet, which carries a control message, wherein the method comprises:
   receiving the LMP packet carrying the control message from a peer LMP node; and
   determining whether a state of a control channel is an available state, according to the LMP packet; and
   updating or resetting a HelloDeadInterval timer, if the control channel is in the available state; and
   the method further comprises:
   when the control channel is in the available state sending the LMP packet processed to the peer node; or
   generating a new LMP packet carrying the control message, wherein, the control message is transmitted via the control channel and does not influence a state of a finite state machine of a local control channel, and sending the new LMP packet to the peer node, and updating or resetting a HelloInterval timer.

2. The method according to claim 1, further comprising:
   when the control channel is in an unavailable state,
   processing the packet according to a LMP specification, if the LMP packet is a configuration packet; otherwise, discarding the LMP packet.

3. The method according to claim 2, further comprising:
   notifying, by the HelloDeadInterval timer, that the control channel fails, if a LMP processing unit does not receive the LMP packet from the peer node within a preset time.

4. The method according to claim 3, further comprising:
   sending a Hello message to the peer node, if the HelloInterval timer exceeds a preset scheduled time.

5. A LMP processing unit, comprising a LMP packet processing unit and a first resetting unit, wherein:
   the LMP packet processing unit is configured to:
   receive a LMP packet carrying a control message from a peer LMP node, and determine whether a state of a control channel is an available state, according to the LMP packet; and instruct the first resetting unit to update or reset a HelloDeadInterval timer, if the control channel is in the available state, and the LMP processing unit further comprising:
a first processing unit, configured to, when the control channel is in an available state: (a) process the LMP packet and send the processed LMP packet to the peer node, or generate a new LMP packet carrying the control message, wherein the control message that is transmitted via the control channel and does not influence a state of a finite state machine of a local control channel, and (b) send the new LMP packet to the peer node.

6. The LMP processing unit according to claim 5, further comprising:
a second resetting unit, configured to, when the control channel is in the available state, update or reset a HelloInterval timer.

7. The LMP processing unit according to claim 6, further comprising:
a second processing unit, configured to, when the control channel is in an unavailable state:
process the LMP packet according to a LMP specification, if the packet is an LMP packet carrying configuration information; or discard the LMP packet, if the packet is not the LMP packet carrying the configuration information.

* * * * *

UNITED STATES PATENT AND TRADEMARK OFFICE
CERTIFICATE OF CORRECTION

PATENT NO.         : 7,860,090 B2
APPLICATION NO.    : 12/262521
DATED              : December 28, 2010
INVENTOR(S)        : Hongguang Guan Page 1 of 1

It is certified that error appears in the above-identified patent and that said Letters Patent is hereby corrected as shown below:

Title Page; item (73);

Sheet 1 of the issued patent, Assignee name should read

--Huawei Technologies Co., Ltd., Shenzhen (CN)--.

Signed and Sealed this
Twenty-second Day of February, 2011

David J. Kappos
*Director of the United States Patent and Trademark Office*